(12) United States Patent
Fisher

(10) Patent No.: US 8,608,523 B2
(45) Date of Patent: Dec. 17, 2013

(54) LIGHTWEIGHT PERSONAL HYDROPLANE WATERCRAFT

(76) Inventor: Tim Fisher, Nashville, NC (US)

( * ) Notice: Subject to any disclaimer, the term of this patent is extended or adjusted under 35 U.S.C. 154(b) by 153 days.

(21) Appl. No.: 13/225,601

(22) Filed: Sep. 6, 2011

(65) Prior Publication Data

US 2012/0097087 A1    Apr. 26, 2012

Related U.S. Application Data

(60) Provisional application No. 61/405,909, filed on Oct. 22, 2010.

(51) Int. Cl.
*B63B 1/00* (2006.01)
(52) U.S. Cl.
USPC ............................. 441/65; 114/363; 114/61.1
(58) Field of Classification Search
USPC ................... 441/65, 72, 74; 114/363
See application file for complete search history.

(56) References Cited

U.S. PATENT DOCUMENTS

| | | | |
|---|---|---|---|
| 998,278 A | 7/1911 | Clifford | |
| 1,024,682 A | 4/1912 | Fauber | |
| 2,007,598 A | 7/1935 | Easthope | |
| 3,143,992 A * | 8/1964 | Beams | 114/61.24 |
| 5,100,349 A * | 3/1992 | Perkins et al. | 440/61 R |
| 5,529,008 A * | 6/1996 | Craig | 114/61.1 |
| 6,347,599 B1 * | 2/2002 | Hendrickson | 114/283 |
| 6,761,602 B1 | 7/2004 | Quinn | |
| 7,410,400 B2 * | 8/2008 | Staudinger | 441/74 |
| 2007/0155261 A1 * | 7/2007 | Cheung | 441/65 |
| 2007/0173144 A1 * | 7/2007 | Yeh | 441/74 |

* cited by examiner

*Primary Examiner* — Stephen Avila
(74) *Attorney, Agent, or Firm* — Daniel Boudwin

(57) ABSTRACT

A lightweight watercraft device designed for use by general consumers and those without means or desire for a traditional, larger boat. The device comprises a pilot seat, an outboard electric motor and steering means mounted to a lightweight foam hull wrapped in a composite shell. The hull comprises a central region bounded by two forward sweeping sides that form the bow of the vessel. The sides taper from bow to stern, terminating at the rear of the boat in a squared configuration. The hull is a unitary foam structure, wrapped in plys of composite material for structural reinforcement. A plank board is bonded between plys along the central axis of the boat, and provides support for the seat, a rear transom board and an area for carrying supplies. Mounted on the transom board is the outboard electric motor, which provides motive power for the vessel.

6 Claims, 3 Drawing Sheets

LIGHTWEIGHT PERSONAL HYDROPLANE WATERCRAFT

CROSS REFERENCE TO RELATED APPLICATION

This application claims the benefit of U.S. Provisional Application No. 61/405,909 filed on Oct. 22, 2010, entitled "Hydroboard."

BACKGROUND OF THE INVENTION

1. Field of the Invention

The present invention relates generally to a lightweight water craft. More specifically, the present invention relates to a lightweight, electric and hydroplane-style boat comprised of an economical design for a personal or multi-person use.

Many consumers enjoy participating in aquatic activities, such as fishing and boating. However, due to the high cost of conventional motor boats, many consumers cannot afford to purchase these items, and are therefore limited in their ability to engage in such activities. Further, conventional watercraft have a host of related upkeep costs, including storage, transportation and year-round maintenance. These costs are additionally prohibitive to consumers. Actual use and access for the everyday consumer may also be difficult. Conventional motor boats can be extremely large and heavy, making them difficult to transport to a water dispatch point, often requiring expensive and specialized boat trailers, as well as a vehicle capable of towing the assembly. For these reasons, traditional motorboats are prohibitive to low and middle income individuals. Even individuals who currently own boats may not utilize them for the reasons previously listed. An alternative, low cost and low maintenance motor boat device is needed to fill this gap in the marketplace and in the art.

Hydroplane boats are boats capable of skimming over the surface of a body of water with a shallow hull, raised wholly or partly clear of the water surface during forward operation. Such boats are typically designed for racing or other sporting activities. However, the present invention focuses on the aspects of hydroplane boats that make them particularly appealing to a consumer. These aspects include their small size, transportability, and their ease and simplicity of operation. Their small size provides a user with watercraft device that is easily deployable using a smaller vehicle, or one that can be handled by hand if necessary. The simplistic design of the hull and outboard motor furthers their access to all users, as upkeep and maintenance are reduced. These qualities are combined with a craft that is relatively high speed and maneuverable on the water, which makes for an enjoyable experience that is attainable for most consumers.

These reasons provide a motive and a clear indication of need in the art for a compact, easily transportable, and economical hydroplane style motor boat, and one particularly suited for personal use with limited luggage items or additional passengers. The present disclosure describes such a device to fulfill this need.

2. Description of the Prior Art

Several patents have been issued directed to hydroplane vessels, in particular those for increasing speed while minimizing expended power. Clifford U.S. Pat. No. 998,278 is directed to vessels constructed with downwardly and rearwardly inclined bottoms for securing a lifting action when advancing. Similarly, Fauber U.S. Pat. No. 1,024,682 is directed to improvements in boats or ships provided with "hydroplane" or downwardly and rearwardly inclined surfaces acting to lift and lessen the submerged area of the hull. The object of the Fauber invention is to make such vessels more efficient, with regard to speed in proportion to propelling power, as well as with regard to their action in high seas or rough water.

Additionally, Easthope U.S. Pat. No. 2,007,598 is directed to improvements in hydroplane hulls having a means for conducting and utilizing air encountered from the bow of the hull towards the stern as an auxiliary means for raising the hull from the water to increase forward velocity. The after step of the hull is above the waterline when travelling at speed, thus the skin friction at the after step is changed from that caused by water to that caused by air. This enables the hull to be propelled at a higher speed per unit of power than before, and to convert the frontal air resistance into useful power.

The Clifford, Fauber and Easthope inventions focus on increasing the lift of the watercraft to reduce friction and thus increase the speed of the boat while minimizing the required power. These inventions focus on producing an optimal speed watercraft, and thus do not focus on the design of a device optimal for a non-racing application and user. The present invention addresses a void in the art related to a hydroplane watercraft geared for the casual user for leisure purposes.

Other prior patents address watercraft boards for recreational hydroplaning. Quinn U.S. Pat. No. 6,761,602 is directed to a hydroplane board member that is placed in very shallow water and launched by a user with a shove of their foot. The user jumps onto the moving board to induce hydroplaning. The user may jump off, simultaneously accelerating a slowing board, and then jump back on, thus indefinitely extending the hydroplane action. Such devices as the Quinn patent, while related to a leisure hydroplane craft, differs in construction, intent and spirit from the present invention. The present invention is a personal hydroplane watercraft, propelled by a small outboard motor and supported by a low cost, low maintenance hull that allows hydroplane boating for recreational use. Its structure substantially diverges in design elements from the prior art and consequently it is clear that there is a need for an improvement to existing personal hydroplane watercraft now present in the art. In this regard the instant invention substantially fulfills these needs.

SUMMARY OF THE INVENTION

In view of the foregoing disadvantages inherent in the known types of lightweight hydroplane watercraft now present in the prior art, the present invention provides a new lightweight, easily operated hydroplane watercraft wherein the same can be utilized for providing convenience for the user when participating in activities such as hunting, fishing, lifesaving or aquatic joy riding.

The present invention provides consumers with a lightweight and cost-effective alternative to a traditional watercraft. The device features a hydroplane boat with an attached outboard motor mounted to a plank board and vertical transom board. The construction of the hull comprises a unitary member of virgin foam, which is coated with epoxy resin and layered with a plurality of plys of composite material for structural reinforcement and for the creation of an outer hull shell. The materials used in the construction of the device provide a boat is very light, stable, and inexpensive to manufacture. The use of composites also provides a considerably stiff and structurally sound craft when compared with its overall weight, which provides a light weight craft that can attain relatively high speeds on the water. Users may use the present invention as a personal watercraft, or for use in various recreational activities including hunting, fishing, lifesaving, or simple aquatic joy riding on a body of water.

It is therefore an object of the present invention to provide a lightweight, hydroplane style watercraft for use in a variety of aquatic activities. A further aspect of the device is that the design will focus upon practicality for the user; as such, the boat will be light, easy to transport and operate in a predictable manner with minimal training, and likewise be easily maintained.

Another object of the present invention is to provide a watercraft that is transportable in a typical truck, SUV or similar vehicle with a roof rack or trailer hitch attachment. The device may further be conveniently loaded and unloaded by a single individual.

A final object is to provide a hydroplane watercraft structure that employs a unitary foam hull, wrapped in plys of a composite material for structural reinforcement. A plank board, mounted along the centerline of the craft, is bonded into the composite layup, and provides a stand to mount a seat, along with a rear transom board that supports an outboard motor.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself, and manner in which it may be made and used, may be better understood by referring to the following description taken in connection with the accompanying drawings. The drawings include like numeral references throughout the description.

DETAILED DESCRIPTION OF THE INVENTION

Figure 1:
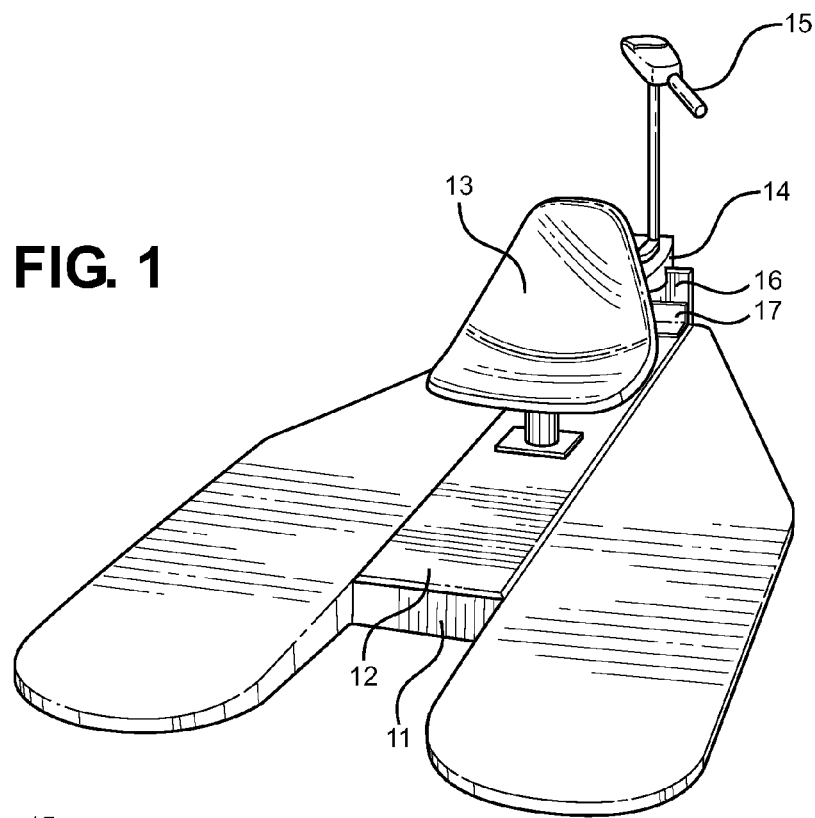
FIG. 1 is a perspective front view of the present invention, demonstrating the personalized size and lightweight construction thereof.

Referring now to FIG. 1, there is shown a perspective front view of the present invention, wherein a personal hydroplane watercraft device is provided. The craft comprises a solid, unitary foam structure that forms a central section and two opposing lateral sections that sweep from the craft bow to the stern. The front of the craft is narrow and expands in cross section toward the stern, terminating at a squared-off back section. The upper surface of the craft is flat for supporting articles thereon, while the underside forms a sweeping hull for providing a hydroplane craft. The foam structure 11 of the craft is wrapped in several layers of composite material to form an outer shell over the foam and provide the craft with the required structural rigidity during operation. Along the centerline of the craft 11 is mounted a center plank 12, which is bonded between layers of composite layers. The plank 12 serves as a foundation for mounting a pilot seat 13 and a rear-mounted transom board 16. The transom board 16 attaches to the rear of the boat and fastens through the center plank 12 for support. An optionally provided L-bracket 17 is provided at the interface between the transom board 16 and the center plank 12 for improved structural stability. This bracket 17 prevents any heel toeing between the two structures, and therefore eliminates any concern about the joint becoming unstable under load. Mounted to the transom board is an outboard motor 14 and an associated steering mechanism 15.

The body of the craft begins as a virgin, closed-cell foam structure. A first layer of composite material, comprising carbon fiber or fiberglass and epoxy resin, is laid up onto the foam structure. The first layer completely envelopes the foam structure to provide a single ply covering. As this first ply cures, the center plank 12 is put into place along the centerline of the craft. The plank 12 is coated with epoxy resin to reduce voids between the plank and the first ply. The lateral edges of the plank are chamfered to provide an isosceles trapezoid cross section. This shape eliminates any right angle interfaces between the center plank 12 and the first ply. A second ply is then overlaid over the first ply and the center plank 12 to envelope the two and to provide a two-ply shell. The preferred embodiment of the craft is a two ply shell; however it is not desired to limit the design of the present invention to a specific ply layup or material system. Further ply layers, as well as different materials may be incorporated as necessary, falling within the scope of providing a lightweight, hydroplane watercraft with an exterior composite shell and interior foam structure.

Figure 2:
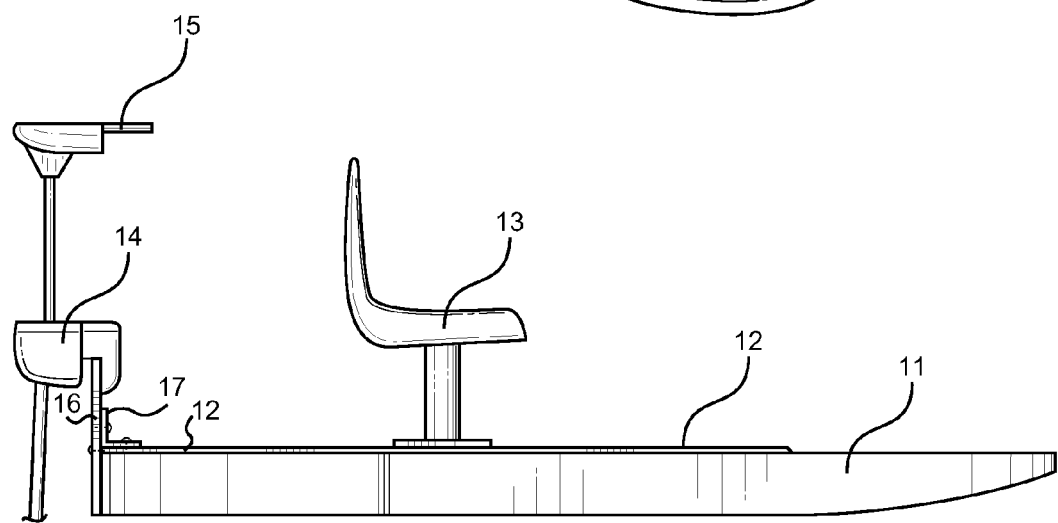
FIG. 2 is a side view of the present invention, showing a single seat embodiment and the shape of the hydroplane hull.

Referring now to FIG. 2, there is shown a side view of a single seat embodiment of the present invention. A pilot seat 13 is mounted to the center plank 12, while space behind the seat along the center plank 12 provides a location for storage or placement of items during operation. If desired, tie down locations may be included for securing items to this area. Mounted on the stern of the craft is an outboard motor 14 and associated steering mechanism 15. The steering mechanism 15 provides directionality for the motor propellers, which are submerged beneath the surface of the water and provide motive force to move the craft. As the craft accelerates, the sweeping underside geometry of the craft provides a hydroplane effect, effectively lifting the craft above or closer to the surface of the water compared to its depth while stationary. The foam structure provides buoyancy for the craft during low speed operation, and supports a design weight limit of passengers and cargo.

The outboard motor 14 is mounted to a vertical transom board 16, which is fastened into the center plank 12 after the craft has been constructed and the composite shell has cured. The motor 14 is preferably an all electric motor, providing reduced emissions, high speed, low noise and low weight along the bow of the craft. Alternate forms of outboard motors, such as single and two-stroke gasoline engines, are also contemplated for use with the present invention; however an all-electric motor is the preferred choice for providing motive power.

Figure 3:
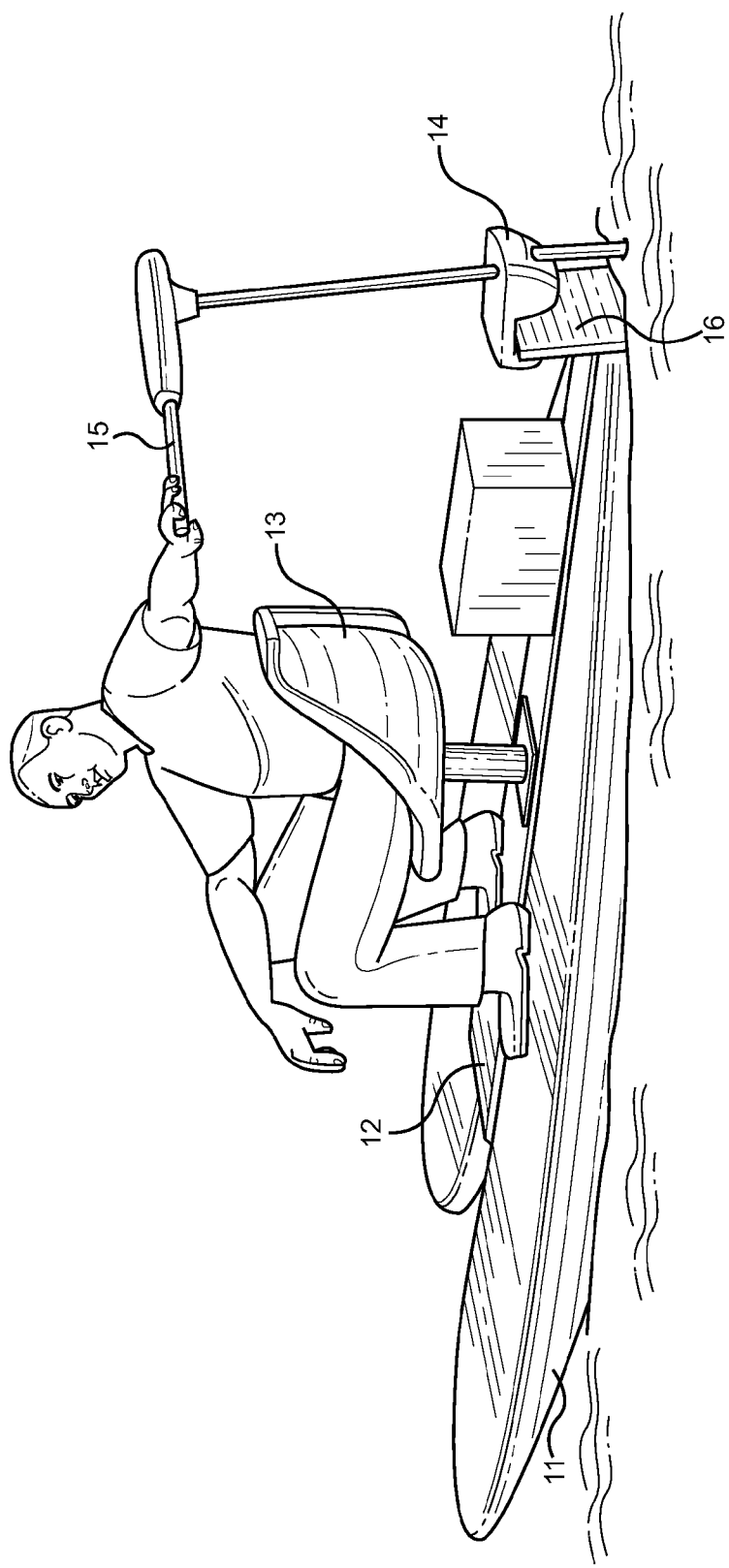
FIG. 3 is a perspective view of the present invention in use.

Referring now to FIG. 3, there is shown a perspective view of the present invention in use. The practitioner sits in the pilot seat 13 mounted to the center plank 12 immediately in front of the motor 14 and steering mechanism 15. The practitioner controls the orientation of the craft by updating the angle of the steering mechanism 15 and thus changing the orientation of the submerged propeller. Speed of the propeller, and thus the acceleration and speed of the craft, is controlled by a throttle mechanism mounted on the steering mechanism, which opens and closes a throttle on the motor or varies power input for an electric motor. As the craft accelerates, the front of the craft lifts slightly out of the water and the craft angles upward in a hydroplaning motion. The steering mechanism may further extend toward the seated user by a provided linkage that allows the user to remain in a forward-facing position while in operation. As the craft velocity increases, the bow of the craft will rise out of the water, and the hull will begin to hydroplane across its surface. During operation, the craft shell provides a low-drag surface for improved speeds, while the electric motor provides ample power. Combined with the low weight and minimal storage capacity onboard the craft, this provides a user with a capably handling and accelerating vessel.

Figure 4:
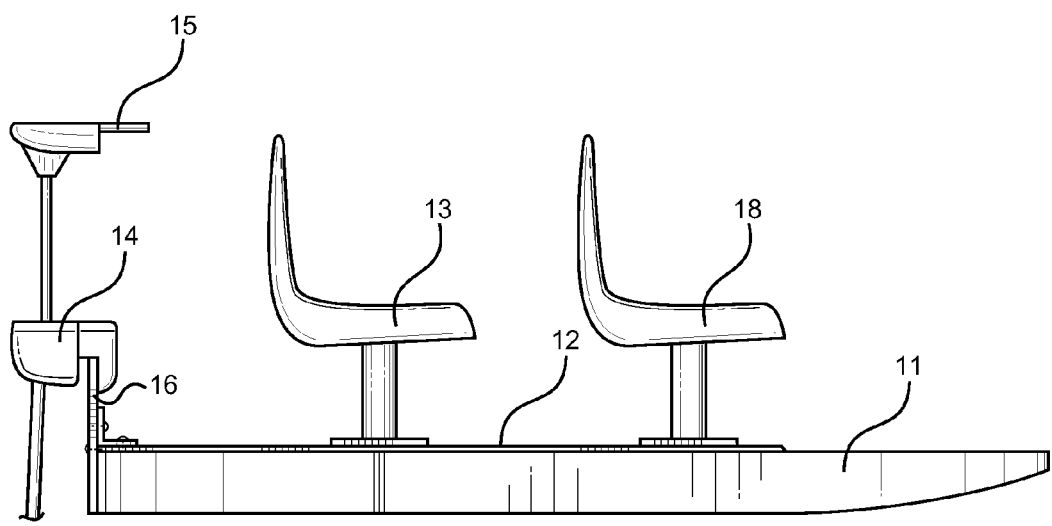
FIG. 4 is a side view of the present invention, showing an alternative, double seat embodiment.

Referring now to FIG. 4, there is shown a perspective view of the present invention, illustrating an alternative, double seat embodiment. In this second conceived embodiment, a passenger seat 18 is mounted in front of the pilot seat 13 along the center plank 12. This alternative embodiment may be a slightly larger or longer craft to accommodate the passenger seat 16 and the additional weight thereof.

In the preferred embodiment, the present invention is designed to provide a consumer with a single-person, convenient and affordable alternative to a traditional watercraft. The invention comprises a small, hydroplane motorboat that allows easy access to recreational boating activities, life saving or other aquatic activities that would benefit from a small, lightweight and relatively fast watercraft. The device includes a steering means 15 and an electric motor 14 that is mounted to a lightweight hull. The hull is comprised of a unitary, solid foam and composite-wrapped structure. The preferred composite material is carbon fiber or fiberglass. Alternatives may be substituted if desired, including Astroquartz, Kevlar, and other fiber-reinforced or glass-reinforced composite materials. The resin system is ideally epoxy resin, which cures the fibers in place. The layup directions, ply count and order is dependent upon application; however it is preferred that the single seat configuration include a two-ply layup of carbon fiber reinforced composite. The center plank 12 and the transom board 16 comprise planks made of pressure treated wood, which are bonded into the composite shell and fastened thereto, respectively. Alternate forms of the plank material include plastic planks or similar lightweight structures. The goal is to provide the lightest craft possible for the user that fits the requirements of the craft while in operation.

Overall, the disclosed invention provides an affordable, lightweight, easy to use and easy to maintain craft that can be deployed using a variety of vehicles and using a single individual. The goal is to provide a watercraft device that is accessible to individuals of all stature and means. Consumers may use this device for various recreational activities, including fishing, boating, swimming, as a hunting transport, or for safety and rescue aid of larger boats. In use, an individual sits in the pilot seat to steer and operate the motor. A linkage or further mechanism may be provided for the user to operate the motor without turning around, or likewise the user may reach behind his or her position to control the speed and direction of the craft. The sweeping sides 11 provide a means to hydroplane the device during high speed operation, while likewise maintaining the stability of the craft in the water, preventing flipping or sinking.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A lightweight, hydroplane watercraft device, comprising:
   a unitary foam structure that forms a central portion and two opposing lateral sections with a sweeping underside hull and an upper surface being flat;
   said foam structure encased in layers of a composite material to form an outer shell;
   a center plank running along a centerline of structure;
   a pilot chair mounted on said center plank;
   a transom board mounted on a stem of said structure; said transom board supports an outboard motor and steering mechanism;
   said lateral sections extend forwardly of said central portion and converge toward said transom board;
   said center plank is bonded between outside layers within said structure outer shell;
   said transom band is further supported by an L-bracket, which fastens to said transom board and said structure;
   said outboard motor is an all-electric motor.

2. A device as in claim 1, further comprising a passenger seat mounted in front of said pilot seat on said center plank.

3. A device as in claim 1, wherein said composite material is a carbon fiber and epoxy resin material system.

4. A device as in claim 3, wherein said composite material further comprises a two ply layup.

5. A device as in claim 1, wherein said composite material is a fiberglass and epoxy resin material system.

6. A device as in claim 5, wherein said composite material further comprises a two ply layup.

* * * * *